Aug. 6, 1929.     S. G. DOWN     1,723,142
REGENERATIVE BRAKE CONTROL
Filed Nov. 10, 1927
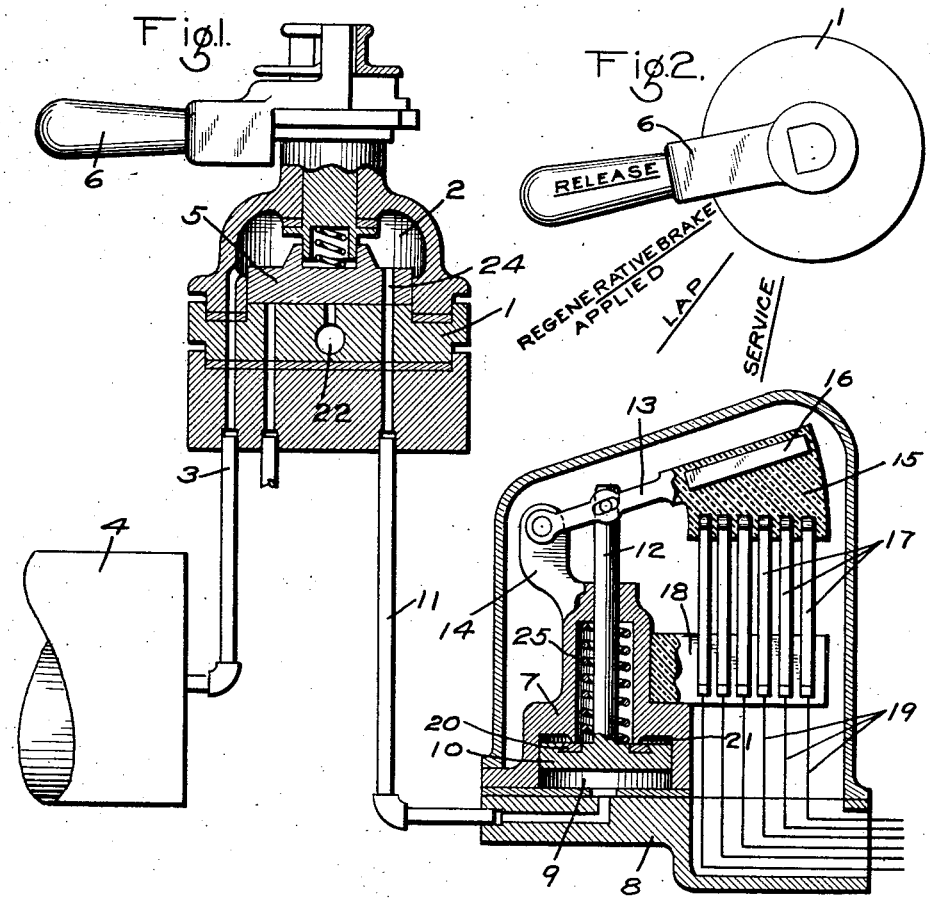
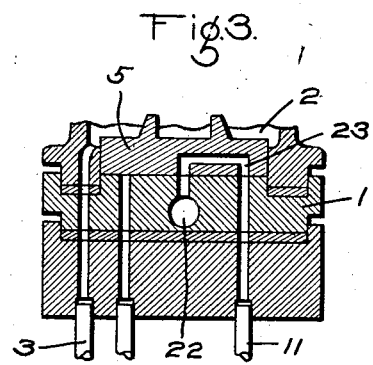
INVENTOR
SIDNEY G. DOWN
ATTORNEY Patented Aug. 6, 1929.

1,723,142

UNITED STATES PATENT OFFICE.

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

REGENERATIVE BRAKE CONTROL.

Application filed November 10, 1927. Serial No. 232,369.

This invention relates to a brake equipment of the type having a fluid pressure brake system and a regenerative brake in which the retardation of the train is effected by operating the vehicle motors as generators.

The principal object of my invention is to provide a brake valve device for controlling the fluid pressure brakes and means controlled by the brake valve device for cutting the regenerative brake into and out of action.

In the accompanying drawing; Fig. 1 is a diagrammatic view of a brake valve device and means controlled by the brake valve device for cutting the regenerative brake into and out of action in accordance with my invention; Fig. 2 a plan view of the brake valve device; and Fig. 3 a sectional view of the brake valve device, showing same in its regenerative braking position.

The brake valve device may be of the usual type comprising a casing 1, having a valve chamber 2, connected by pipe 3 to the usual main reservoir 4 and containing a rotary slide valve 5 adapted to be operated in the usual manner by handle 6.

The means for cutting the regenerative brake into and out of action may comprise a cylinder casing 7 secured to a base plate 8 and having a piston chamber 9 containing a piston 10, the piston chamber 9 opening to a pipe and passage 11 which leads to the seat of the rotary valve 5.

Carried by the piston 10 is a stem 12 which extends out through an opening in the casing 7 and which has its outer end pivotally connected to an electric switch lever 13. At one end, the switch lever is pivotally mounted on an arm 14 carried by the casing 7 and the other end is provided with a section 15 of insulating material to which is secured a contact member 16.

A plurality of contact fingers 17 are secured to a block of insulation 18 which is mounted on the casing 7 and said fingers are connected to wires 19, said wires being so connected to the power and regenerative brake system that when the contact fingers are electrically connected together by the contact 16, the circuits of the system will be connected up so as to cause the motors to operate as generators and thus produce the well known regenerative braking action.

A coil spring 25 acts on piston 10 and urges same in a direction to cause the contact member to engage the contact fingers 17 and the piston 10 is provided with an annular seat 20 adapted to engage an annular seat rib 21 when the piston is moved to its upper position by fluid under pressure supplied to piston chamber 9, so that possible leakage of fluid from said chamber is prevented when the piston is seated in its upper position.

In Fig. 2 are shown some of the usual positions of the brake valve device termed release, lap, and service, and according to my invention, the brake valve device is provided with an additional regenerative brake applied position, which is preferably disposed intermediate the usual release and lap positions of the brake valve device.

In the regenerative brake applied position, as shown in Fig. 3, pipe 11 is connected to an atmospheric exhaust port 22 through a cavity 23 in the rotary valve 5 and in all other positions of the brake valve device, pipe 11 is connected through a port 24 in the rotary valve 5 with valve chamber 2. The regenerative brake position of the brake valve device is such that the fluid pressure brakes remain released.

In operation, the fluid pressure brakes may be controlled in the usual manner by manipulation of the brake valve handle 6 and in the usual positions of the brake valve, the port 24 registers with pipe and passage 11, so that fluid under pressure from the valve chamber 2 as supplied thereto from the main reservoir 4, is supplied to piston chamber 9 and thereby the piston 10 is maintained in its upper position, in which the switch lever 13 is positioned, so that the contact member 16 is out of engagement with the fingers 17 and consequently the regenerative brake is cut out of action.

If it is desired to cut the regenerative brake into action, the brake valve handle 6 is turned to the regenerative braking position, in which pipe and passage 11 is connected to the atmosphere through cavity 23 in the rotary valve 5 and exhaust port 22. Fluid under pressure being thus vented from piston chamber 9, the piston 10 is shifted downwardly by the spring 25, causing the switch lever 13 to be moved, so that the contact member 16 engages the contact fingers 17 and thus completes the necessary control circuits, so that the regenerative brake is cut into action.

In some cases, it may be desired to operate the regenerative brake at the same time that the fluid pressure brake is operated. For this purpose, it is only necessary to so arrange the cavity 23 in the rotary valve, that it will connect the pipe 11 with the exhaust port 22 when the rotary valve 5 is in service position as well as when the valve is in the regenerative brake position shown.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with means operated by variations in fluid pressure for controlling the cutting in and cutting out of action of a regenerative brake, of a brake valve device having positions for controlling the brakes pneumatically and a regenerative brake position independent of the pneumatic positions in which fluid is vented from said means.

2. The combination with means operated by variations in fluid pressure for controlling the cutting in and cutting out of action of a regenerative brake, of a brake valve device having a release position, a lap position, and a regenerative brake position intermediate the release and lap positions, and in which fluid is vented from said means.

In testimony whereof I have hereunto set my hand.

SIDNEY G. DOWN.